United States Patent [19]

Robinson et al.

[11] Patent Number: 5,428,399
[45] Date of Patent: Jun. 27, 1995

[54] METHOD AND APPARATUS FOR IMAGE TRANSLATION WITH IMPROVED MOTION COMPENSATION

[75] Inventors: Roger N. Robinson; Brian R. Mason, both of Bourne End, United Kingdom

[73] Assignee: Vistek Electronics Limited, Buckinghamshire, England

[21] Appl. No.: 868,438

[22] Filed: Apr. 15, 1992

[30] Foreign Application Priority Data

Apr. 15, 1991 [GB] United Kingdom ................. 9107980
Mar. 6, 1992 [GB] United Kingdom ................. 9204949

[51] Int. Cl.$^6$ ............................................. H09N 7/01
[52] U.S. Cl. .................................... 348/459; 348/911; 348/452
[58] Field of Search ................. 358/140, 11, 214, 336; H04N 7/01; 348/911, 452, 459, 458, 445, 448, 447, 699, 700

[56] References Cited

U.S. PATENT DOCUMENTS

| | | | |
|---|---|---|---|
| 4,864,398 | 9/1989 | Avis et al. | 358/140 |
| 4,998,167 | 3/1991 | Jagua . | |
| 5,036,393 | 7/1991 | Samad et al. | 358/140 |
| 5,221,966 | 6/1993 | Clayton | 348/911 X |

OTHER PUBLICATIONS

BBC Reasearch Department No. RD 1987/11 (1987)/.
BBC Research Department Report "Digital Standards Conversion: Interpolation Theory and Aperture Synthesis", undated.
*Shimano et al.* publication, undated.
*Beanland* "ISIS" publication, undated.

*Primary Examiner*—Victor R. Kostak
*Attorney, Agent, or Firm*—Lowe, Price, Leblanc & Becker

[57] ABSTRACT

Images may be stored on film or on one of the TV/video standards. Film comprises a sequence of frames each of which corresponds to the same point in time. Video, however, comprises a sequence of frames each comprising an interlace of 2 fields which successively scan the image and thus each field does not correspond to the same point in time.

Due to these inherent differences, when converting from film to one of the TV standards and between the TV standards when at least part of the image originates on film, distortions are introduced particularly when there are any objects moving in the image.

The present invention includes a vector motion estimator (10) providing motion vectors which are indicative of any objects moving and are used to manipulate the standards converter (8) so as to accommodate for the moving objects.

11 Claims, 12 Drawing Sheets

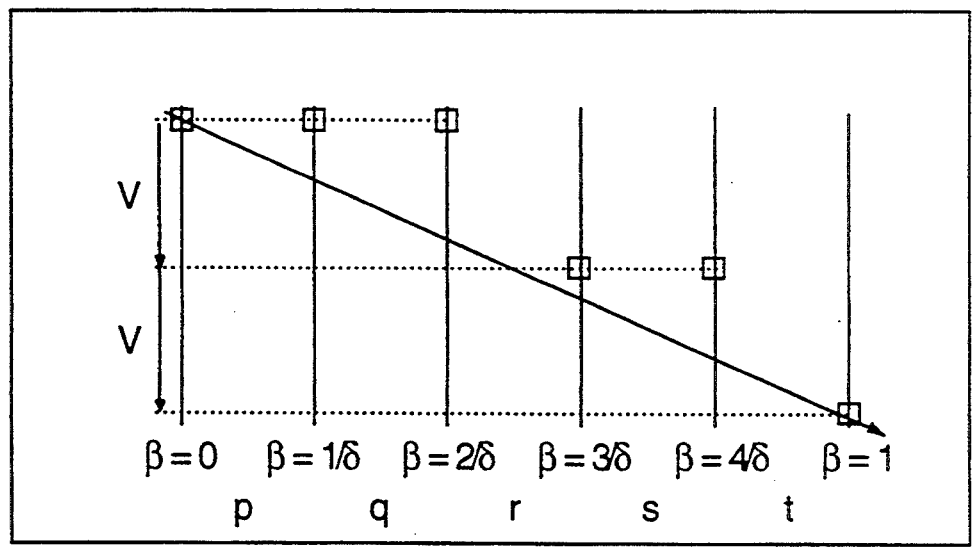

FIG. 11a

|  |  | δF-- | δF- | δF+ | δF++ |
|---|---|---|---|---|---|
| $0 < \beta < 1/\delta$ | p | $(1+2\beta)V/2$ | $(0+2\beta)V/2$ | $(0+2\beta)V/2$ | $(0+2\beta)V/2$ |
| $1/\delta < \beta < 2/\delta$ | q | $(0+2\beta)V/2$ | $(0+2\beta)V/2$ | $(0+2\beta)V/2$ | $(-1+2\beta)V/2$ |
| $2/\delta < \beta < 3/\delta$ | r | $(0+2\beta)V/2$ | $(0+2\beta)V/2$ | $(-1+2\beta)V/2$ | $(-1+2\beta)V/2$ |
| $3/\delta < \beta < 4/\delta$ | s | $(0+2\beta)V/2$ | $(-1+2\beta)V/2$ | $(-1+2\beta)V/2$ | $(-2+2\beta)V/2$ |
| $4/\delta < \beta < 1$ | t | $(-1+2\beta)V/2$ | $(-1+2\beta)V/2$ | $(-2+2\beta)V/2$ | $(-2+2\beta)V/2$ |

FIG. 11b

METHOD AND APPARATUS FOR IMAGE TRANSLATION WITH IMPROVED MOTION COMPENSATION

TECHNICAL FIELD

The present invention relates to an apparatus for and method of image translation and in particular to, but not exclusively to, high resolution transfer of images from film to video and vice versa or from one T.V. standard to another where the images originated on film.

BACKGROUND ART

In the cinema industry, images are recorded on film. Each image is a single photographic exposure so that all parts of the image correspond to roughly the same point in time. Typically, but not always, images are captured on film at an exposure rate of 24 frames per second.

In the television industry, images can be stored not only on film but also directly as an electronic video signal. It is not uncommon for television programmes to have some of the images recorded on film and some recorded as a video signal.

Images when represented as a video signal comprise a number of orthogonal scanning lines formed by scanning the image from left to right and top to bottom as the scene is viewed. Consequently, the lower right hand parts of any image are scanned at a later point in time than the upper left hand parts. Each of the scanning lines contains luminance (brightness) or chrominance (colour) information for the image.

For each image or frame, the video electronic signal scans twice: a single scan is called a field. Thus, each image or frame comprises two video fields and each video field contains half the lines of an image or frame. The lines of the first field overlap the lines of the second field such that the lines are vertically off-set by half a line height so that each line of the second field lies between the lines of the first field. This technique is known as interlacing.

Again, the images are captured at a particular frame rate. Due to the history of television, different parts of the world have adopted different frame rates. The two most common frame rates are 25 frames per second or 50 video fields per second comprising 625 lines per image which is most prevalent in the UK and parts of Europe and substantially 30 frames per second, that is to say approximately 60 video fields per second comprising 525 lines per image and is most prevalent in North America. When fully encoded with colour information, the former is known as PAL (Phase Alternate Line) and the latter is known as NTSC (National Television Standards Committee). Hereinafter when referring to the PAL standard, one is referring to the frame rate and line number and similarly for the NTSC standard.

In spite of the images being stored on different mediums and at different frame rates, it is highly desirable to convert those images from film to video and vice versa and from one TV standard to another. To accommodate for the various frame rates, various techniques are used and the following list the most common types of conversion.

1. Images recorded on film are stored at 24 frames per second. Such images, if replayed at a slightly higher rate, namely 25 frames per second can readily be used for the PAL standard which uses 25 frames per second or 50 fields per second. Each film frame is repeated to form two video fields. This is shown diagrammatically in FIG. 1. In this case there is a small problem with the accompanying audio due to the frame rate being increased by 4%. Furthermore, there is the fundamental difference between film and video in that the whole of a film frame relates to the same instant in time, whilst the two video fields making up the video frame represent different points in time. This means that the temporal sampling has changed from 24 samples/sec (or possibly 25) to 50 samples/sec. This difference, while not necessarily unacceptable in itself since both the cinema and television industries have been quite happy for many years, becomes noticeable when a programme is created from both film and video source material.

2. The conversion process is more complicated when the images are initially stored on film at a frame rate of 24 frames per second and it is desired to convert those images to the NTSC standard at 30 frames per second or 60 fields per second. This is because of the non-integral relationship of 60 to 24. In general five video fields are to be made from two film frames by taking three consecutive fields from one frame and two consecutive fields from the next frame. This is usually known as 3:2 pulldown conversion or 3:2 ratio conversion. When three fields are taken from one frame there will always be a repeated field, but this repeat may be of either the first or second field. Since five is an odd number the full cycle is in fact ten fields, or four frames, until the full phase is restored. This type of conversion is shown diagrammatically in FIG. 2.

3. The above problems are further compounded when the images or some of them are initially stored on film at a frame rate of 24 frames per second which is then converted to the NTSC standard at 30 frames per second and then converted to the PAL standard at 25 frames per second. Alternatively, some of the images may be stored on film which is then converted to the PAL standard and then to the NTSC standard.

An example of the above three types of conversion can be found in U.S. Pat. No. 4,998,167 by Jaqua.

The conversion process between TV standards is relatively straight-forward. That is to say converting images stored on NTSC at 30 frames per second to images stored on PAL at 25 frames per second and visa versa. Here one must take into consideration the different frequencies, the different number of lines and the different formats of encoding the electronic signal. This conversion process is known in the art as Standards Conversion. However, Standards Conversion per se is not the subject of the present invention. Some understanding of Standards conversion is however required to appreciate the present invention.

An early Standards Converter was known as the ACE Standards Converter which used a 4 field, 4 line aperture. It entered service in the early 1980s and is still in use today. Subsequent improvements have centred around the size, power, consumption, stability, reliability and decoder performance over the intervening ten years.

Television is a complex sampling process. That is to say, the image is sampled temporally at the PAL or NTSC standard so that each point or location in the image is regularly sampled at the relevant frequency. Each image is then sampled vertically by the scan lines progressing from the top to the bottom of the screen using the line structure. If the signal is to be processed digitally it will be further sampled horizontally on a pixel basis resulting in a three dimensionally sampled signal. Standards conversion is thus the process of transferring the signal from one or more of these sample rates to another.

Creating one sequence of regular samples from another is known as interpolating, and is a quite well understood form of digital filtering. For further reference information on interpolating, one can find relevant details in BBC Research Department Report No 1984/20 or UDC 621.397.65.

In essence, the value of each sample at the new sample points is calculated by summing weighted contributions from the nearest input samples. How many input samples need to be used, and the relative weightings to be applied to them, are decisions made by the designer, and govern the compromise between cost, complexity and performance. The overall family of weighting factors is known as the 'aperture' of the filter since it represents the window of input samples which are used to create each output sample.

Television standards conversion is not simply the application of a temporal aperture, to convert the field frequency, and a vertical aperture to convert the line frequency. Field interlace means that each field sample is displaced vertically from its predecessor and successor by half a line, therefore vertical and temporal resampling are interrelated which can be achieved by a two dimensional non-separable interpolator.

It is generally agreed that for high quality processing the aperture should have a minimum width of four field lines and four fields. This means that every output line is made up from weighted contributions from the four nearest lines on the four nearest fields, making 16 in all. The relevant weights, or filter coefficients, depend on the relative position of the output line with respect to the input lines and field timing. This is shown diagrammatically in FIG. 3.

In all cases however whether converting from film to TV or between TV standards, due to the different methods of storing those images and the different frame rates, some distortions of the image are introduced when converting from one type to another. Some of these distortions are concerned with grey scale and colorimetric differences and ways of minimizing some of these distortions are well known and do not form the subject of the present invention. However, there is one particular type of distortion which is particularly apparent when converting *moving* objects in images. A moving object is that which is in a different location within the image on successive frames or successive fields.

In the aforementioned U.S. patent by Jaqua, a motion detector is used to determine if there have been any editing cuts so as to disturb the field sequence. The motion detector does not however provide information on any moving objects so as to improve the resolution of the conversion.

In contrast, some allowance has been made for object movement when converting from one TV standard to another.

When using a two dimensional interpolator, for example, it has acceptable resolution with stationary images. There is some loss of vertical resolution, but this is inherent to an interpolating filter. Thus as conversion of stationary images is a spatial conversion, relatively high resolution can be obtained. However, the same could not be said for moving images as the conversion is not then just spatial. Any motion in the scene will thus appear as multiple images on the output since four input fields contribute to each output. The quality of this motion portrayal is a compromise between blurring and irregular motion known as judder (a form of aliassing), and is controlled by the selected aperture coefficients.

Aliassing is a type of distortion and juddering is the visual effect of aliassing. Aliassing is caused by a sampled signal containing frequencies above one half of the sampling frequency. This results in erroneous frequencies appearing in the signal which are indistinguishable from the same frequencies had they been in the original: hence the term aliassing. In a temporally sampled signal, such as television, the erroneous frequencies result in the irregular motion of objects, which, unless indistinct due to blurring, will appear to judder.

Hitherto, some standards converters have detected the presence of motion and modified the apertures used to provide a high vertical resolution for stationary images, whilst low resolution, i.e. a different aperture, is used for moving images. This technique is known as motion *adaptive* interpolation. Full details of motion adaptive interpolation can be found in International Broadcast Engineer March 1989 p. 40–43 inc. Among, the problems associated with adaptive interpolation in the standards converter is that the result is often an obvious change in resolution as soon as any movement occurs in the picture.

Recent developments in digital signal processing have enabled real time analysis of video signals so as to provide allowances for motion when converting from one standard to another. In essence, the conversion process utilizes an analysis of the incoming video to generate motion vectors describing movement within the scene and uses them to allow for the deficiences of the conversion process.

A motion vector describes the motion of all or part of an image. It represents both the direction and scale of the motion.

Thus another way of allowing for movement in standards conversion is called motion *compensation* which uses these motion vectors. A basic diagram of such a motion compensator as applied to the input video signal can be found in FIG. 4. For further information regarding motion compensation, please refer to Shimano et al. 1989. —Movement Compensated TV Standards Converter using motion vectors, SMPTE Proceedings 1989. The resolution from such motion compensation is, however, highly unsatisfactory.

DISCLOSURE OF THE INVENTION

Thus, the problem sought to be overcome by the present invention is to accommodate for objects moving in an image when converting from film to one of the TV standards or when converting between TV standards when part or all of the image originates on film. In the former case, to date no techniques have been known to make allowances for moving objects. In the later case, the two stages of conversion introduce and compound the distortions. As discussed above, standard converters with some form of motion compensation are known. Such standards converters are not able to provide high resolution when some of the images originate from film. Furthermore, such conversion has hitherto badly accommodated for the intermediate video tape being edited and thus disturbing the field sequence.

Hence an aim of the present invention is to provide an apparatus for and method of image translation when at least part of which originates on film and which has a higher resolution than known to date.

According to the present invention there is provided an apparatus for translating images at least part of which were originally stored on film, said images being represented by an electronic input signal having a number of input frames of a first frequency and being translated to an electronic output signal having a number of output frames of a second frequency, said apparatus comprising;

means for converting said input signal to the output signal, said converting means including a number of storage means each for storing a field of the input signal; an address generator for controlling the or each of the storage means; an interpolator coupled to the or each of the storage means for filtering the fields of the input signal having been stored in the storage means to derive the output signal; characterised by:

a motion estimator for providing motion vectors of any objects moving in the image, said motion estimator is coupled to said address generator for manipulating the read or write addresses and is coupled to the interpolator for manipulating the filtering thereby to compensate for movement of objects in the image.

According to the present invention there is provided a Standards Converter for converting images between one TV standard to another in which at least a part of the images were originally stored on film, said images being represented by an input signal having a number of input frames in the input TV standard and being translated to an output signal having a number of output frames in the output TV standard, said Standards Converter comprising;

a number of storage means each for storing a field of the input signal; an address generator for controlling the or each of the storage means; an interpolator coupled to the or each of the storage means for filtering the fields of the input signal having been stored in the storage means to derive the output signal; characterised by:

a motion estimator for providing motion vectors of any objects moving in the image, said motion estimator is coupled to said address generator for manipulating the read or write addresses and is coupled to the interpolator for manipulating the filtering thereby to compensate for movement of objects in the image.

According to the present invention there is provided a telecine for translating images originally captured on film to a video signal, in which said images are represented by an electronic input signal having a number of input frames of a first frequency and being translated to said video output signal having a number of output frames of a second frequency, said telecine comprising;

means for converting said input signal to the output signal, said converting means including a number of storage means each for storing a field of the input signal; an address generator for controlling the or each of the storage means; an interpolator coupled to the or each of the storage means for filtering the fields of the input signal having been stored in the storage means to derive the output signal; characterised by:

a motion estimator for providing motion vectors of any objects moving in the image, said motion estimator is coupled to said address generator for manipulating the read or write addresses and is coupled to the interpolator for manipulating the filtering thereby to compensate for movement of objects in the image.

According to the present invention there is provided a method of translating images at least part of which were originally stored on film, said images being represented by an electronic input signal having a number of input frames of a first frequency and being translated to an electronic output signal having a number of output frames of a second frequency, said method comprising;

converting said input signal to the output signal including storing one or more fields of the input signal each in a respective storage means and interpolating across the or each field of the input signal having being stored in the respective storage means, characterised by generating motion vectors of any objects moving in the image and manipulating the storage and interpolation steps using said motion vectors to compensate for objects moving in the image.

BRIEF DESCRIPTION OF DRAWINGS

Embodiments of the present invention will now be described with reference to the accompanying drawings of which:

FIG. 11a is a graph illustrating a moving object originally stored on film having undergone a 3:2 conversion to a video electronic signal;

FIG. 11b lists the required address offsets for the five different types of output fields as shown in FIG. 11a;

BEST MODE FOR CARRYING OUT THE INVENTION

To reiterate, the present invention is directed towards an apparatus for and method of image translation when part of the image originates on film providing high resolution particularly where there are moving objects in the image. This is achieved by utilizing known motion vectors in a novel manner so as to compensate for objects moving in the image. Such high resolution of moving images has become increasingly more important with the introduction of high definition television systems.

Figure 5:
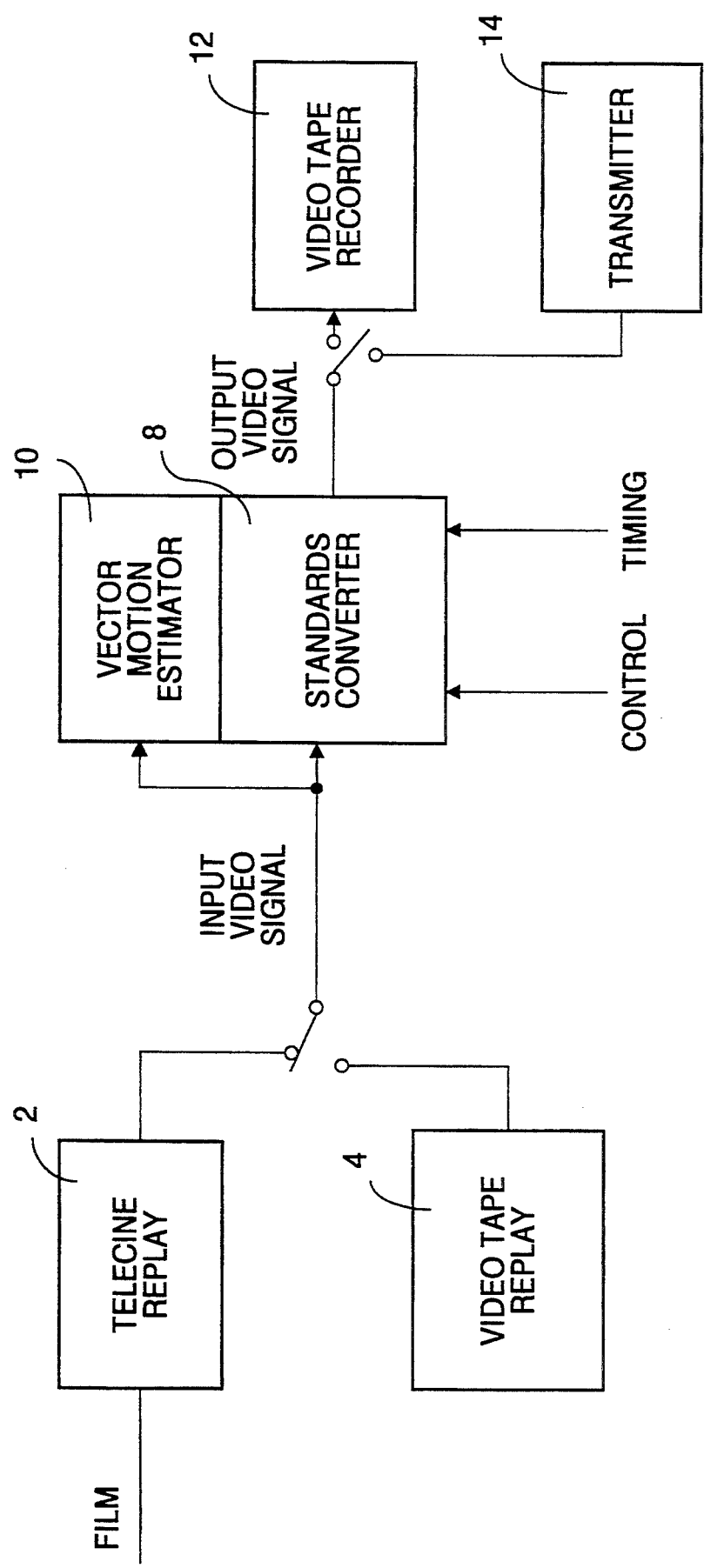
FIG. 5 is a schematic block diagram of a preferred embodiment of the present invention used to translate images from one standard to another.

FIG. 5 illustrates the preferred embodiment of the present invention. The preferred embodiment may be used to convert images originally stored on film to a video electronic signal of either of the most common standards or from one standard to another. The output could be stored as another video standard or transmitted directly.

In order to convert images originally stored on film it is first converted to a video electronic signal at a frame rate of 24 frames per second by an apparatus 2 known as a telecine. Some known telecines, rather than generating a video signal of sequential fields, generate a video signal of each frame. This video signal of each frame is then stored in a memory known as a frame store. When reading from the frame store, alternate lines are read to create the two sequential fields for each frame as in a normal video signal. Alternatively, the preferred embodiment may be used to convert a video electronic signal by replaying a video tape replay 4 which can be switched between PAL at 50 Hz or NTSC at 60 Hz.

Any one of these signals is then applied to an apparatus 8 known as a standards converter. The standards converter 8 is usually used to convert from one television standard to another but when converting from film to video it may not be required to change the field or line frequencies. The conversion is controlled by timing information from the input and output signal. The input and output signals each contain information regarding the start and end of the frame, fields and lines. It is this information which is used to control the standards converter 8. A further control is also applied to the standards converter 8 to dictate what conversion frequencies are relevant for any particular conversion.

A vector motion estimator 10 receives the input video signal to analyse the motion in the image. The vector motion estimator is coupled to the standards converter providing motion vectors to compensate for moving objects in the image. The converted images are then output to a video tape recorder 12 or directly transmitted via a transmitter 14.

Figure 6:
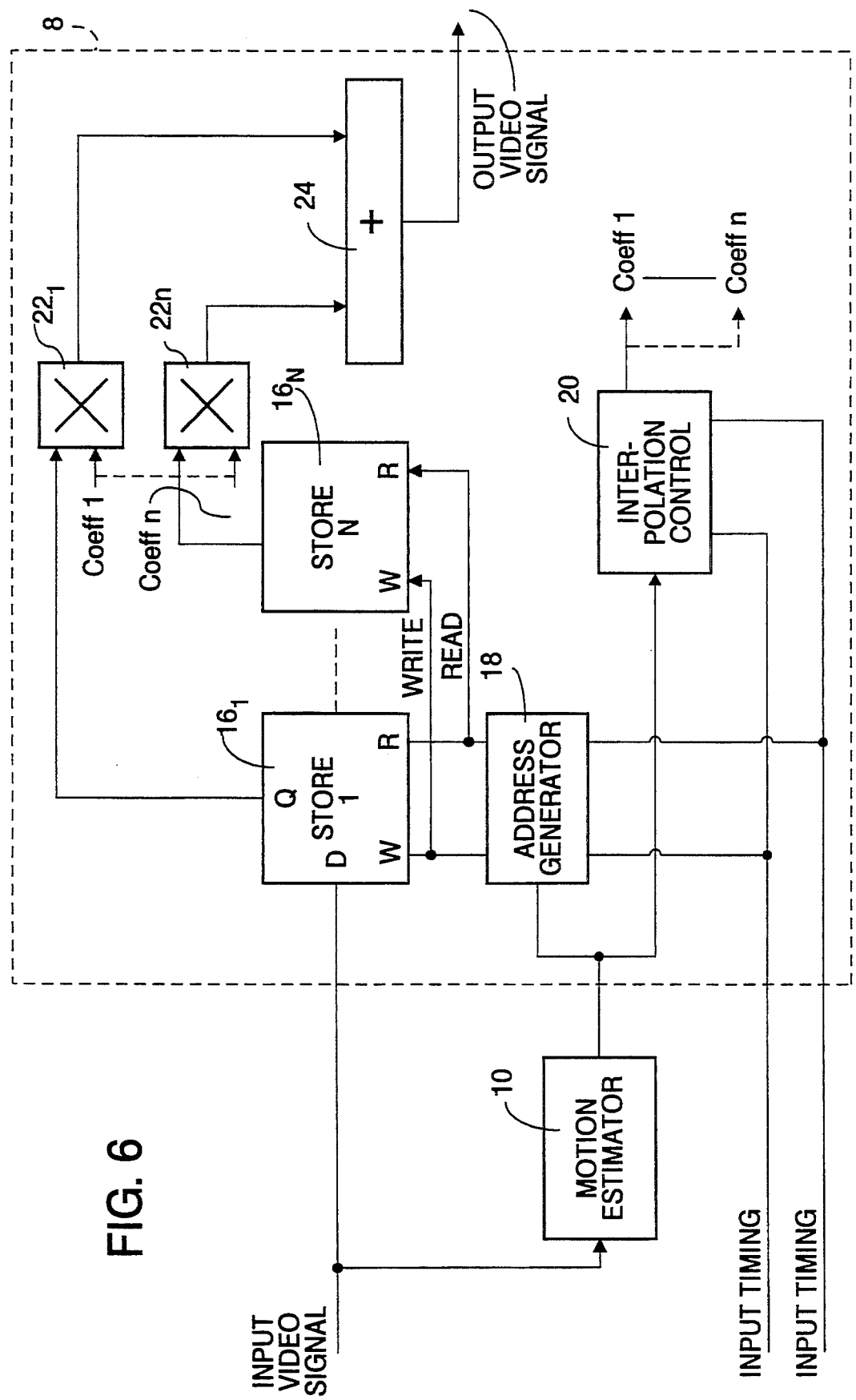
FIG. 6 is a schematic block diagram in more detail of the standards converter and vector motion estimator according to the preferred embodiment.

The preferred embodiment of the present invention is illustrated in more detail in FIG. 6. From this diagram, one can clearly identify the input video signal being applied to both the standards converter 8 and the vector motion estimator 10. The standards converter 8 comprises a memory of N stores $16_1$ to $16_n$ where N is an integer and typically equals 4. Thus, if each store 16 holds one field of video information, the memory at any one time stores four fields of the electronic video signal.

Alternatively, there may be only two stores 16 which is actually simpler to implement but the conversion does not have the same performance of brightness changes and vector inaccuracies. An optimum compromise between the standards converter 8 becoming too complex and adequate resolution on translating images has been found when there are four fields stored at any one time in the standards converter.

The fields are stored usually by controlling the addresses into which each pixel is written such that the addresses move monotonically across and down the store. Typically, each store 16 comprises a random access memory (RAM)

Each store 16 is designed to hold one field of video information from the video electronic signal. An address generator (18) controls the storing of such video information by controlling the read and write address sent to the stores 16. Again the timing information from the input and output signals is supplied to the address generator 18 to control the fields being stored in the stores 16 by way of the read and write addresses.

A discussed previously, the standards converter 8 includes an interpolator 20. The interpolator 20 receives timing information of the input video signal to generator a set of coefficients. Details of the interpolation are not significant to the present invention and various methods can be used.

One suitable method is described in the aforementioned BBC Research Department Report numbered RD 1984/20 or UDC 621.397.65 entitled Digital Standards Conversion: Interpolation Theory and Aperture Synthesis. This document describes the derivation of a 2 dimensional non-separable filter particularly suited to standards conversion, but this is by no means the only type of filter that may be used.

The coefficients 1 to N from the interpolator 20 are used to control the relative weighting of the output signals from each store $16_1$ to $16_n$. When converting from one standard to another, this enables lines to be created where no lines existed previously from the adjacent four field lines over four fields. All the weighted contributions are then summed to provide the video output signal. As shown in FIG. 6, this is achieved by N multiplers 22 each coupled to an adder 24. However, alternative arrangements are envisaged such as the use of a multipler and summer for each stage arranged in a cascade.

Since, the conversion is a sequentially sampling process, 4 fields are initially stored and interpolated and then the successive 4 fields are stored and interpolated. That is to say, the first 4 fields a to d are supplied and then b to e and then c to f and so on.

As stated previously, the details of the motion estimator 10 are not significant to the present invention. However, details can be found in many articles, for example BBC Research Department Report (No. RD 1987/11 or UDC 621.39.3). Many vector motion estimators can provide motion information to a resolution to at least as fine as a signal picture element or pixel. If the resolution is better than a single pixel and it is expected that with increasing development work on vector motion estimators then such better resolution will be obtainable, then the standards converter 8 can use such sub-pixel data.

The vector motion estimator 10 is coupled directly to the input video signal. The output of the vector motion estimator 10 is directly coupled to the address generator 18 and interpolator 20 of the standards converter 8. By such direct connection, this leads to two ways in which the resolution of the translated images is vastly improved.

The vector motion estimator 10 is coupled to the address generator 18 to provide motion vectors so as to compensate for moving objects in the image. This can be achieved in two ways both of which involve manipulation of the read or write addresses.

Figure 12A:
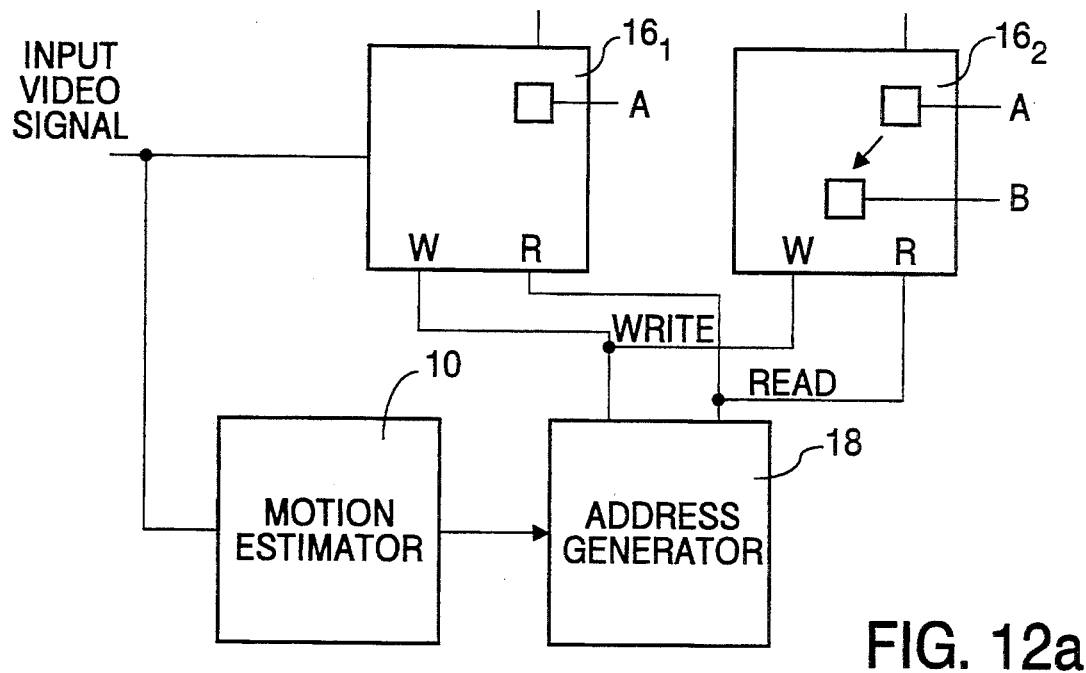
FIGS. 12a and 12b are schematic block diagrams illustrating the manipulation of the read or write addresses of the address generator by the motion estimator.

The first way involves the address generator 18 assigning each pixel of the input video signal to the corresponding element in the store. In this case, the motion vectors are used to anticipate where the object has moved with respect to the image on successive or adjacent fields and provides read information to the location in the successive or adjacent store where the object is now stored. With reference to FIG. 12a, the vector motion estimator 10 has identified an object in the first video field in location A. The address generator 18 stored the object in its corresponding location A in store $16_1$. However, as the vector motion estimator 10 has detected the movement of the object, it provides a motion vector giving the scale and direction of movement to the address generator 18. Thus, a new read address is generated from the motion vector so that on the successive store $16_2$ the image is read from location B which is the location the vector motion estimator 10 anticipates the image to move to.

Figure 12B:
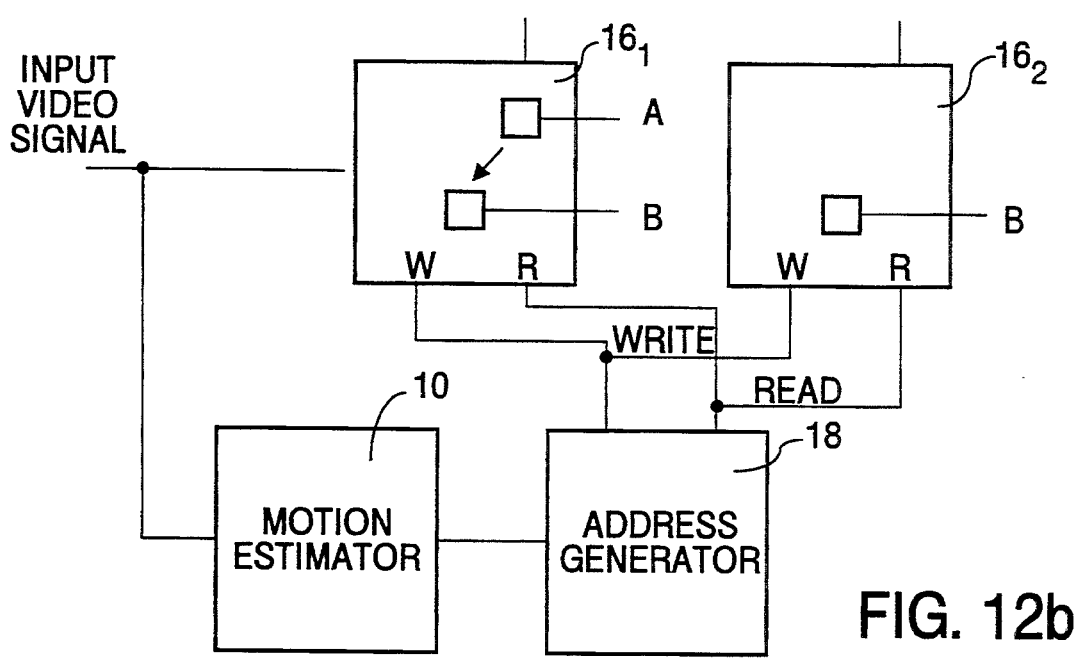

The alternative method is for the motion vectors to manipulate the write address of the address generator 18. This enables a moving object to be stored in the first field in the location where the object has moved to in the successive field. With reference to FIG. 12b, the vector motion estimator 10 detects an object which is moving and which should be stored in store $16_1$ at location A. However, through manipulation of the write address, the object is stored at location B which is the location the object moves to in the next field which is stored in store $16_2$. The read addresses for the first field are not manipulated as the moving object is already in the same location as the next field.

In each case, the information relating to the moving object is taken from each of the four fields for suitable weighting to provide requisite information for the output video signal.

The vector motion estimator 10 is also coupled to the interpolator 20. The motion vectors provided to the interpolator 20 enable the coefficients to be modified so as to alter the particular weight applied to each of the output signals from the stores 16. Since the vertical addressing of each field store may be changed by the motion vectors by a non-integral number of field lines, so the aperature coefficients used by the interpolator also need to be modified by the motion vectors. Thus, the video signal of a moving object can be correctly filtered even if the scanning lines have changed.

In summary, the motion vectors are used to manipulate not only the location of storage of a moving object but also the weight applied to it.

Detail of the processing will now follow using the preferred embodiment of four fields of the input video signal. It is also assumed that the motion is linear over the four fields and although this does introduce errors for non-linear movement, the practical effect of such errors is not significant.

Figure 7:
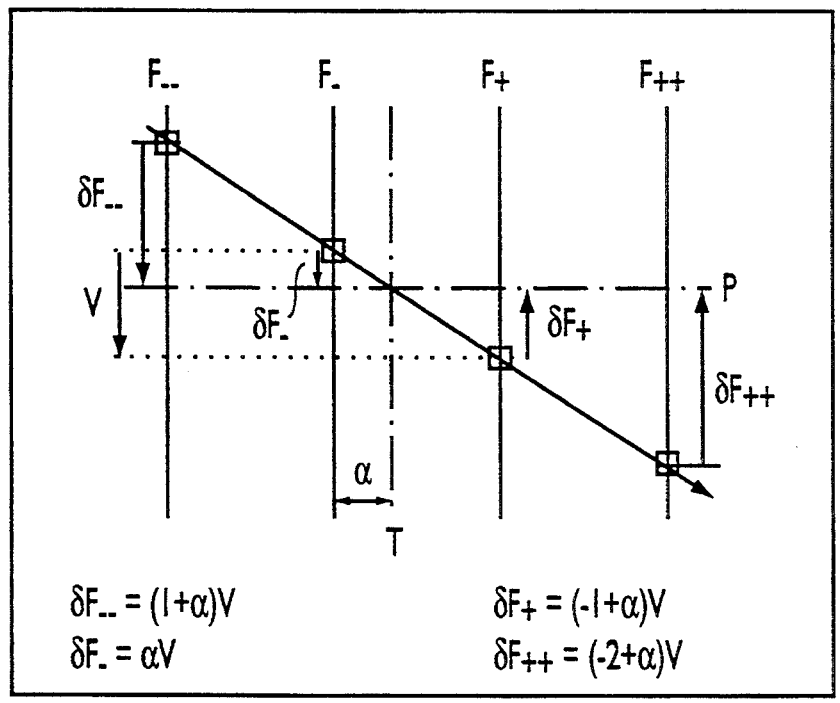
FIG. 7 is a graph illustrating an object in constant motion over four fields.

An object in constant motion over four field is shown in FIG. 7. The direction of motion, shown as down in the drawing, can be any direction in the real scene. Each of the four fields, $F--$, $F-$, $F+$ and $F++$, a represent a field on the input video signal and the small square is the object moving a constant amount, V, during each field interval. During the conversion process the output field will generally be at some point between two input fields. In FIG. 7 this is shown by the broken line, T, and the inter-field spacing is shown by $\alpha$. Thus, $\alpha$ varies between 0 and 1 according to the timing of the output field T, with respect to the two nearest input fields $F-$ and $F+$ in FIG. 7.

That is to say, when $\alpha=0$ the start of the output field is co-incident with the start of the first input field. When $\alpha=1$ the end of the output field is coincident with the end of the second input field.

By knowing $\alpha$ and the amount of motion, V, the position of the object at time T is also known. This is shown by the broken line, P, in FIG. 7. The displacement of the object on each of the four fields $F--$, $F-$, $F+$ and $F++$, is given as follows:

$\delta F-- = (1+\alpha) V$
$\delta F- = \alpha V$
$\delta F+ = (-1+\alpha) V$
$\delta F++ = (-2+\alpha) V$ These displacements depend solely on $\alpha$, V and the time of the field with respect to T.

By adjusting both horizontally and vertically the memory address used to read from or write to the four stored fields, $F--$, $F-$, $F+$ and $F++$, by the corresponding offsets, then the images of a moving object obtained from the four stores can be aligned to the nearest pixel. Subsequent interpolation carried out over the four fields will then occur between images which are spatially coincident to an accuracy limited by the accuracy of the compensation system. The relative coefficient weighting applied to the four fields can be made dependant on $\alpha$ to give an appropriate temporal response. The effect of positional errors in the compensation system is reduced by the temporal filtering imposed by the interpolating aperture.

Limitations of the process are the general accuracy of the generated vectors, and how vector failures are handled. These failures can occur on the edges of moving objects and create the difficulty of revealed or concealed backgrounds. This happens when the system 'knows' an object has moved but doesn't 'know' the background that has subsequently been revealed. In practice the system should gracefully fall back to a linear 4 field converter, but this still leaves a part of the problem which appears as 'tearing' behind moving objects. However there are known techniques which help to minimise this problem and these are not the subject of the present invention.

Thus motion compensation can be applied when translating images from one medium to another or from one standard to another. In respect of each of the three most common conversions required, the present invention will now be described with reference to those particular conversions.

Figure 1:
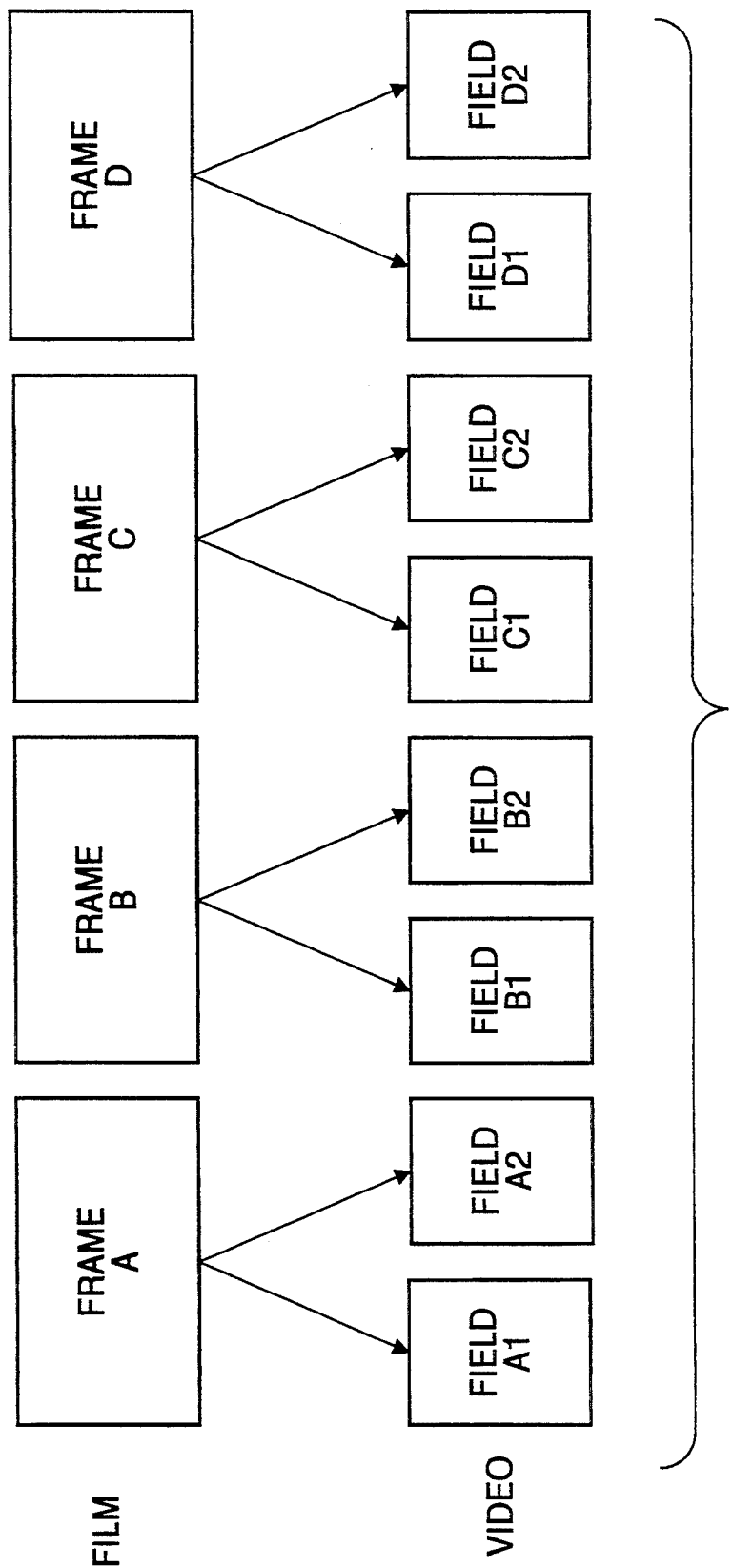
FIG. 1 is a block diagram illustrating conversion of film frames to field frames of a PAL standard.

1. Hitherto, when converting film to the PAL standard, the film is usually converted by replaying the film at 25 frames per second rather than 24 frames per second. Alternatively, the film is sometimes exposed at a frame rate of 25 frames per second which can be more easily converted to the PAL standard. As discussed previously, in the former conversion, this 4% increase in frame rate has created problems in the associated audio but modern digital signal processing can correct for the pitch change. In either case, however each pair of fields in the output video signal is derived from the same film frame at the same point in time as shown in FIG. 1. This is unlike direct video signal which has successive fields at a different point in time.

Figure 8:
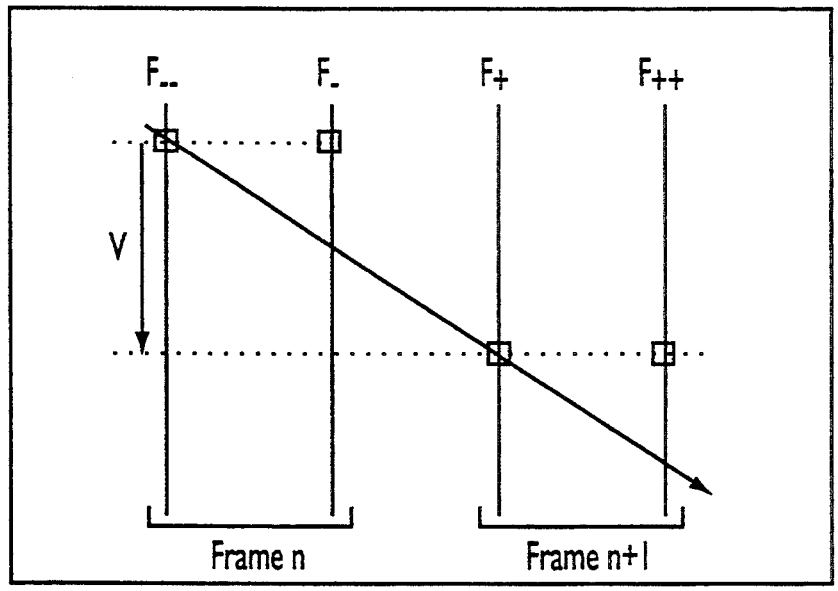
FIG. 8 is a graph illustrating a moving object previously stored on film and how it would appear on four video fields.

In the preferred embodiment, one disregards the effects of interlace so that a moving object from film will appear on four video fields as shown in FIG. 8.

In this case the motion should be measured over a frame period or possibly over a field period and stored for one field. In general, the former is preferred because of simpler control, and similarities in handling of the vectors. Note that in either case the actual measured vector is still the motion over a frame period, and is thus double that described earlier and used in normal standards conversion.

Figure 13:
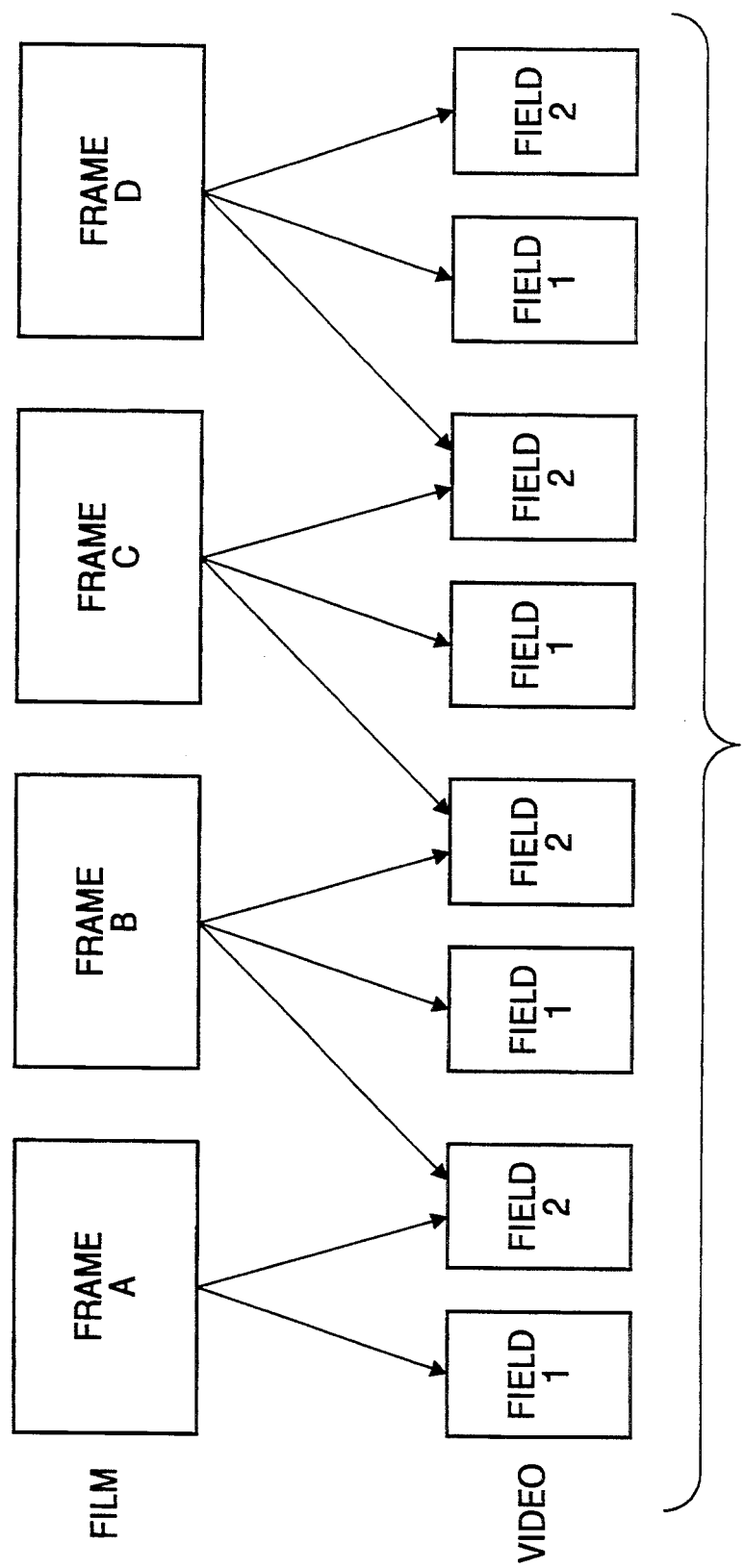
FIG. 13 is a block diagram illustrating conversion of film frames to field frames of a PAL standard using motion estimation signals.

Schematically a simple case may be described in FIG. 13 where one of each pair of fields is derived directly from a film frame, and the alternate field is derived from a compensated mean of two or more frames. This is the case where $\alpha$ (as described earlier) is zero. A more general case is where $\alpha$ is non-zero, when each field is derived from weighted contributions from two or more motion compensated frames.

Figure 9:
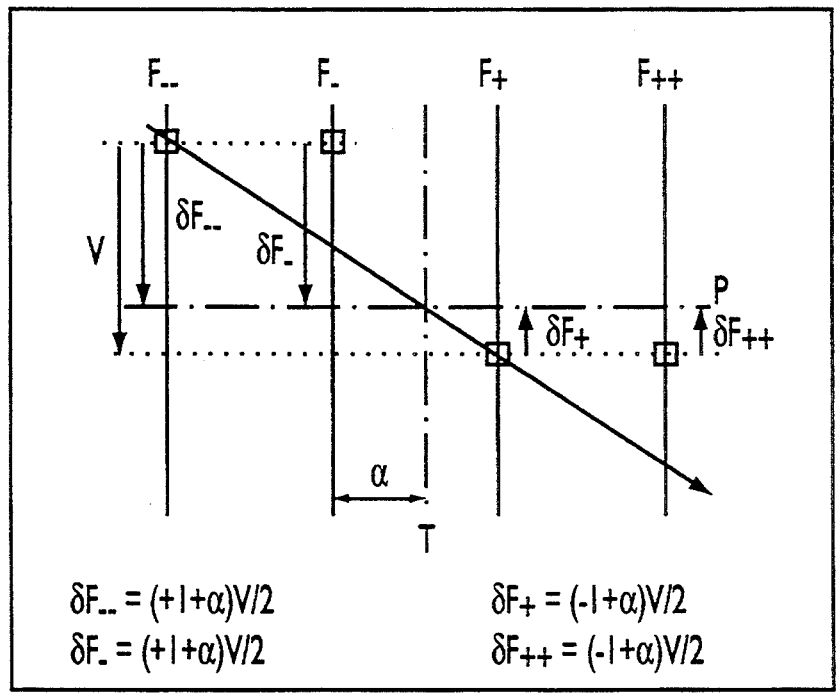
FIG. 9 is a graph and table illustrating a moving object originally stored on film being converted to a video electronic signal where the output field is between two non co-sited input fields.
Figure 10:
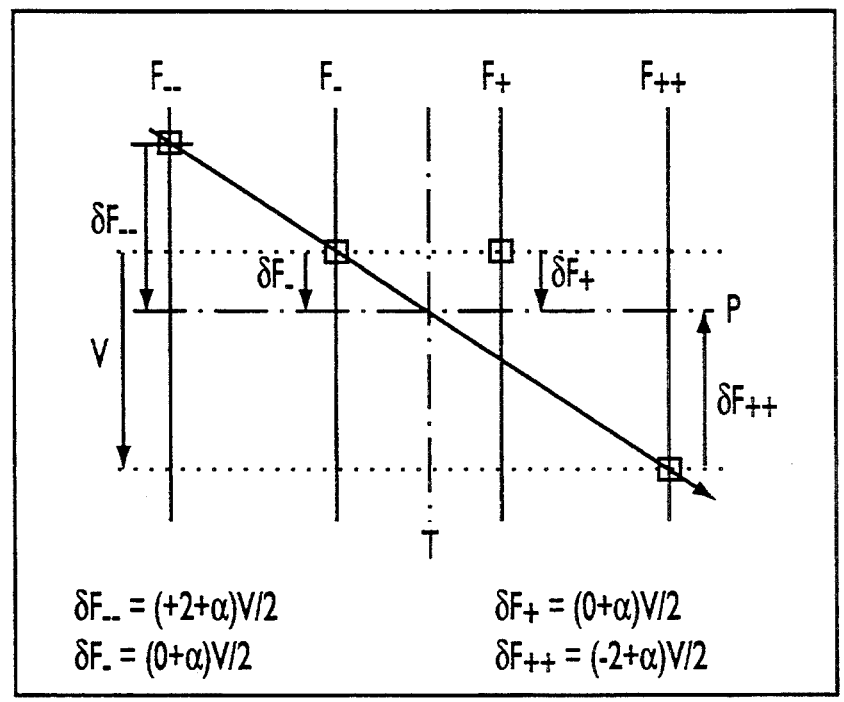
FIG. 10 is a graph and table illustrating a moving object originally stored on film being converted to a video electronic signal where the output field is between two co-sited input fields.

If the two nearest fields to the required output field have been derived from the same input frame (then it is considered to be temporally 'co-sited' and this is shown in FIG. 10. Conversely if the two input fields have been derived from separate frames then they are considered temporally 'non-co-sited', and this is shown in FIG. 9. Accordingly, the resolution of the resultant video output signal is greatly improved.

That is to say, when the timing of the output field corresponds to a time between two input fields which have been derived from the same field frame then these two fields are co-sited. When the output field is timed between two fields from differing film frames when they are non-co-sited.

Since the system has been designed around a 4 field converter offsets are applied to all 4 fields. In practice a 2 field aperture could be used to reduce some of the motion compensation artifacts but the 4 field aperture improves the response to brightness changes and residual registration errors from incorrect vectors as discussed above.

In a direct 25fr/s film to 50 Hz video transfer $\alpha$ will be generally constant although, it will in fact vary slowly if the converter is synchronising the signal between two slightly different scanning references. However, to allow for the conversion from 24fr/s film to 50 Hz video, $\alpha$ must be allowed to take a range of values.

Normally the interpolation will alternate between the co-sited and non-co-sited cases on each field, but the phase of this switching must be correct. This is another function of the motion estimator which must recognise the co-sited fields. This is achieved since if there is, by some means of averaging, a low overall difference between two successive fields then they are likely to be derived from the same original film frame, or there is little or no motion in the sequence (in which case the distinction between co-sited and non-co-sited is not important). If there is a significant difference then the two fields will have been derived from separate frames, i.e. non-co-sited. There is also the possibility that there has been an editing cut which would may cause a discontinuity in the sequence, and will also cause a large field difference.

Figure 2:
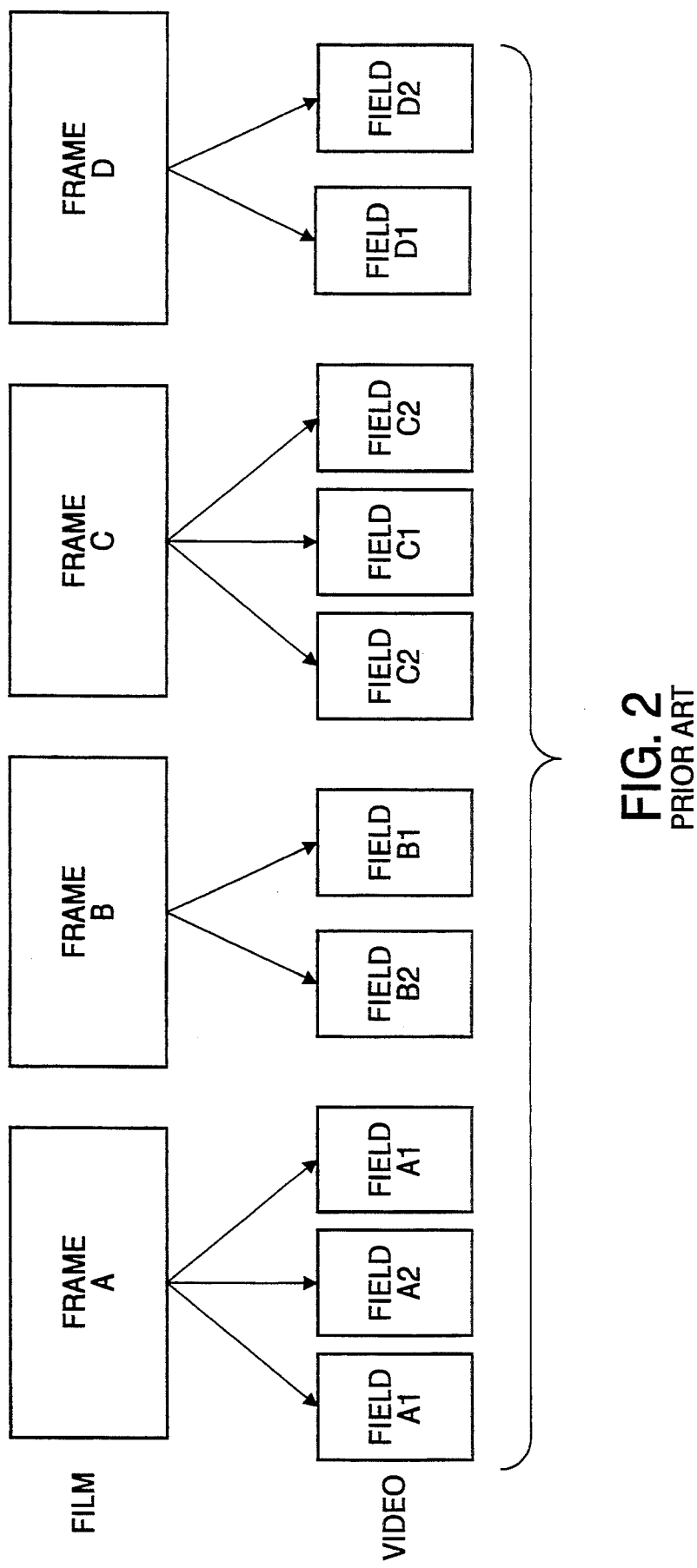
FIG. 2 is a block diagram illustrating conversion of film to an NTSC standard using a technique known as 3:2 ratio conversion.
Figure 3:
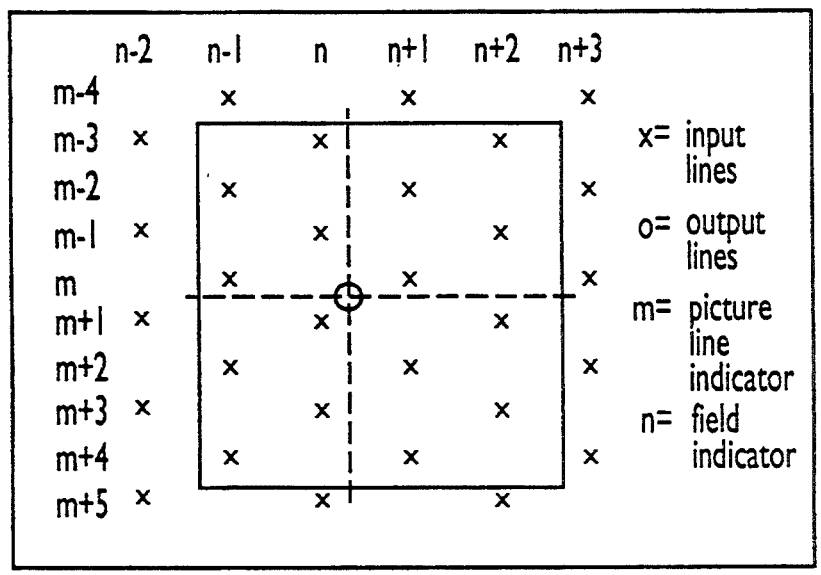
FIG. 3 is a schematic diagram of the lines and fields contributing to an aperture when using four fields and four lines in Standards Conversion.
Figure 4:
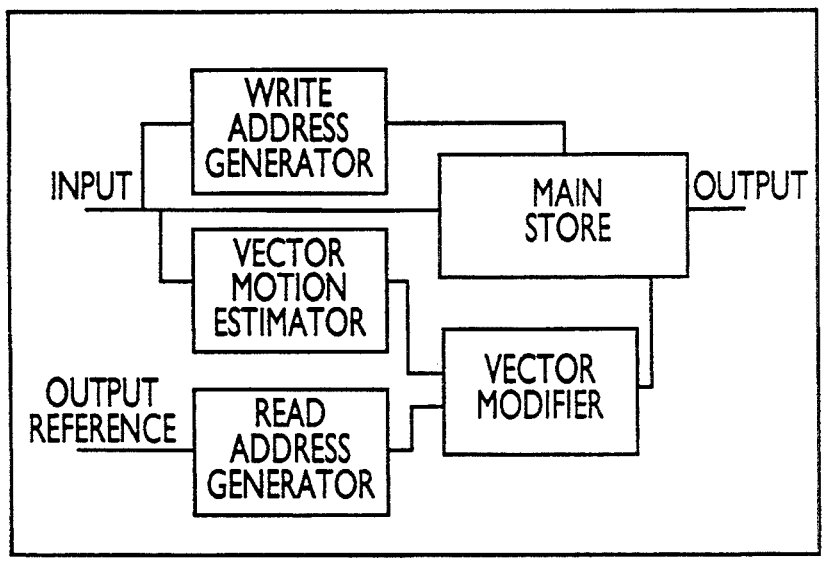
FIG. 4 is a block diagram of a vector motion estimator being applied to a video signal undergoing conversion from one standard to another.

2. The preferred embodiment is also applied when converting film to the NTSC standard at 30 frames per second. This is more complex than converting to the PAL standard and is usually done by 3:2 conversion as discussed previously and as shown in FIG. 2. In this case, alternate frames A, C have a repeated field. Again, duplication of fields means that the same fields are at the same point in time which is unlike direct video signal and introduces errors with moving objects.

Figure 14:
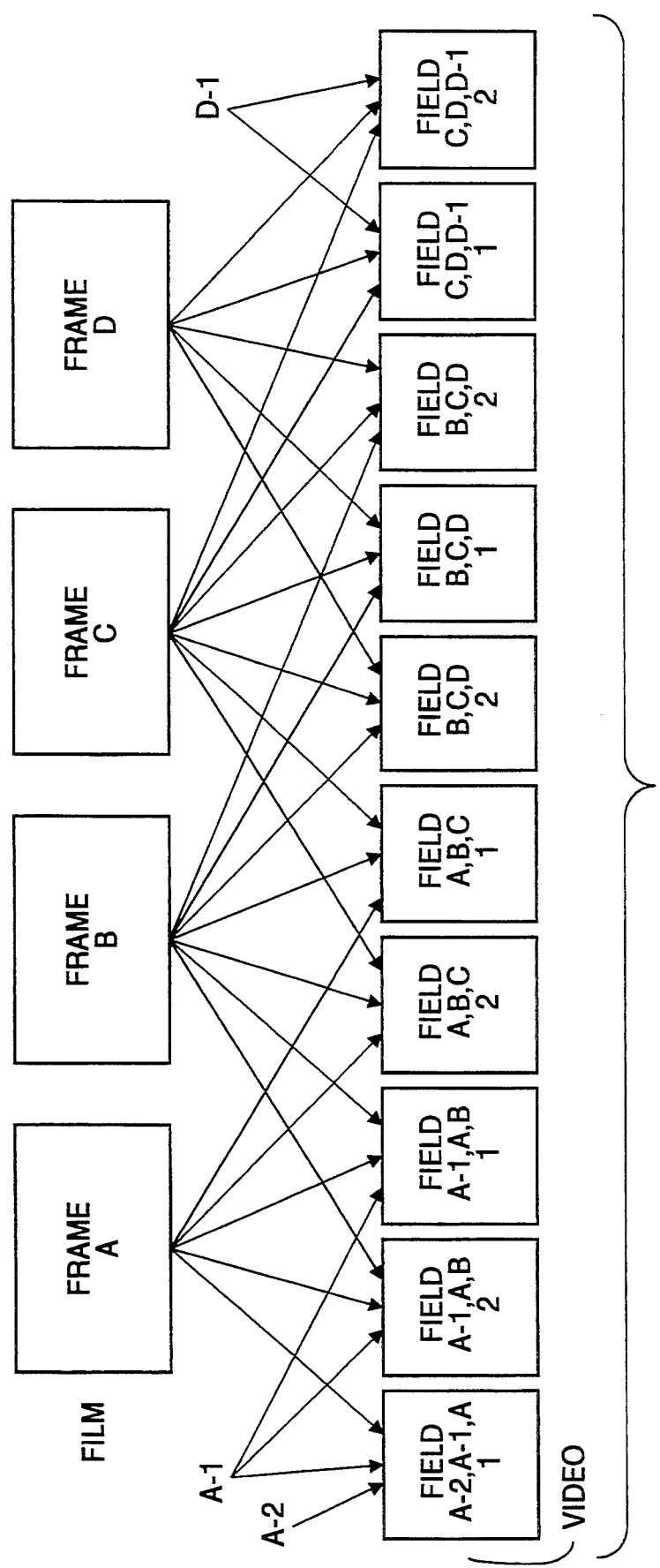
FIG. 14 is a block diagram illustrating conversion of film frames to field frames of an NTSC standard using motion estimation signals.

When motion compensation is applied to this conversion, each output field is derived from three of the input frames as shown in FIG. 14. As the contribution from each input frame is motion compensated, the resolution of the output video signal is vastly improved. It should be noted that it is not important that three frames contribute to each output field and indeed the number of frames may vary according to the accuracy required from the motion estimation process.

The manner in which the motion estimation is applied is identical to that shown in FIGS. 9 and 10. However, the phasing of co-sited and non co-sited fields is more complex. A further difficulty is a null vector field whenever a third field has been derived from a single frame. This can be overcome by using an earlier vector field suitably delayed.

Instead of alternating between co-sited and non co-sited fields the sequence is more complex. It is generally of the form:

| c | c | n | c | n etc |
|---|---|---|---|---| where c represents temporally co-sited fields and n represents non co-sited fields.

It is important that the motion estimator 10 detects the correct phasing of this sequence and controls the converter accordingly, which includes the masking of the missing vector field mentioned above. This phasing is particularly important when the film is transferred to videotape before motion compensation is applied since any subsequent editing may disturb the regular 3:2 sequence.

To interpolate smooth motion over the five field sequence, $\alpha$ is no longer adequate on its own and a separate variable, $\beta$, is used which again varies linearly from 0 to 1 over the whole sequence. However, unlike $\alpha$ which is a measure of the timing of the output field, T, with respect to the two nearest input fields, $\beta$ is a measure of the timing of the output field, T, with respect to its position in the 5 field sequence. In this time interval the total motion is 2 V, since two frame periods have elapsed and so the motion gradient is $(2/\beta)V$ per field.

Instead of simply co-sited and non co-sited fields, as in the earlier cases, there are now five separate field types. These are shown diagrammatically in FIG. 11 and the required vector offsets on each field for each of the field types is shown in Table 1. In this table, each of the letters p, q, r, s and t represent the timing of the output field T for that particular field.

3. Hitherto, the greatest errors have been encountered when transferring images previously subjected to the 3:2 ratio conversion to the PAL standard at 25 frames per second. If motion compensation according to the present invention as described in the previous section has already been applied in the first stage of the conversion then subsequent conversion should be done using 'conventional' standards conversion with or without known motion compensation techniques. If, however, the first stage to the NTSC standard involves no motion compensation then motion compensation according to the present invention should be applied in the standards conversion to PAL stage. The transfer to the PAL standard also requires vertical interpolation as usual for a change of standard, but the relative time, $\beta$, changes more rapidly and is more complicated to calculate.

Figure 15:
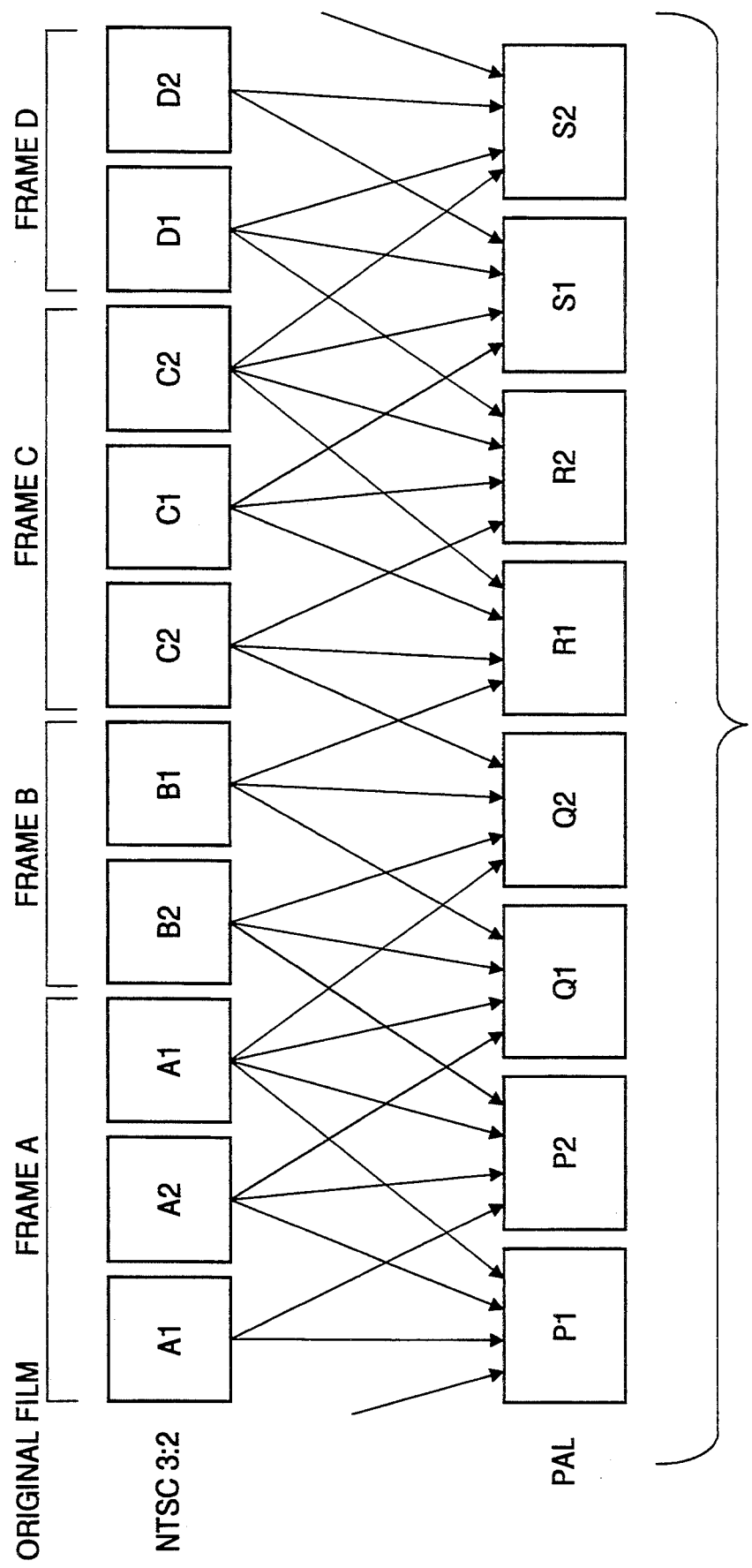
FIG. 15 is a block diagram illustrating conversion of film frames to fields of an NTSC standard and then to fields of a PAL standard using motion estimation vectors.

Each field of the output video signal has contributions from four input fields as shown in FIG. 15. Accordingly, since the motion estimator can detect the phase of the 3:2 conversion the correct input fields contribute to each output field.

An additional advantage of the ability of the motion estimator to calculate the phase of the 3:2 ratio conversion, is that it is possible to convert the image even when part of the image sequence was stored on film or directly as a video electronic signal. An even greater advantage of being able to detect the phase of the 3:2 ratio conversion is to accommodate for when the ratio conversion is not continuous as which often happens after editing. This is because the motion estimator always measures the relative displacement and the address generator and interpolator compensate accordingly.

The aforegoing description has been given by way of example only but modifications may be made without departing from the scope of the present invention. For example, although the present invention is mainly applied to the conversion of images from film to video and between video standards, the present invention can also be used for the inverse operation of transferring video to film. In this case, the interlaced video signal is effectively converted to a sequential scan before conversion to film. Indeed, the motion compensation is of great benefit to interlace to sequential conversion in general.

Furthermore, the present invention is also applicable to converting from the PAL standard to the NTSC standard when part or all of the original image comes from film.

Also, it should be noted that the embodiments illustrated in FIGS. 5 & 6 are not limitative. For example, the vector motion estimator 10 may be incorporated in the telecine 2 and used solely for converting from film to one of the TV standards. Alternatively, the vector motion estimator 10 may be incorporated in the standards converter 8. Otherwise, given the compatibility of the standards converter 8, the vector motion estimator 10 may be separate therefrom.

We claim:

1. An apparatus for translating images at least part of which were originally stored on film, said images being represented by an electronic input signal having a number of input frames of a first frequency and being translated to an electronic output signal having a number of output frames of a second frequency, said apparatus comprising:
   a number of storage means each for storing a field of the input signal;
   an address generator, coupled to said storage means, for controlling said storage means;
   an interpolator coupled to said storage means for filtering the fields of the input signal stored in said storage means to derive the output signal; and
   a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images,
   wherein said input signal is translated to said output signal in real time.

2. An apparatus for translating images at least part of which were originally stored on film, said images being represented by an electronic input signal having a number of input frames of a first frequency and being translated to an electronic output signal having a number of output frames of a second frequency, said apparatus comprising:
   a number of storage means each for storing a field of the input signal;
   an address generator, coupled to said storage means, for controlling said storage means;
   an interpolator coupled to said storage means for filtering the fields of the input signal stored in said storage means to derive the output signal; and
   a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images,
   wherein said motion estimator creates new image frames corresponding to intermediate movements in time between original input image frames.

3. The apparatus of claim 2, wherein said motion estimator retrieves information from consecutive input image frames and measures the motion of individual elements within an image frame and the motion of individual elements of at least one consecutive input frame to create a new intermediate image frame.

4. A standards converter for converting images between one TV standard to another in which at least a part of the images were originally stored on film, said images being represented by an input signal having a number of input frames in the input TV standard and being translated to an output signal having a number of output frames in the output TV standard, said Standards Converter comprising:
   a number of storage means each for storing a field of the input signal;
   an address generator, coupled to said storage means, for controlling said storage means;
   an interpolator coupled to said storage means for filtering the fields of the input signal stored in said storage means to derive the output signal; and
   a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images,
   wherein said input signal is translated to said output signal in real time.

5. A Standards Converter for converting images between one TV standard to another in which at least a part of the images were originally stored on film, said images being represented by an input signal having a number of input frames in the input TV standard and being translated to an output signal having a number of output frames in the output TV standard, said Standards Converter comprising:
   a number of storage means each for storing a field of the input signal;
   an address generator, coupled to said storage means, for controlling said storage means;

an interpolator coupled to said storage means for filtering the fields of the input signal stored in said storage means to derive the output signal; and a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images, wherein said motion estimator creates new image frames corresponding to intermediate movements in time between original input image frames.

6. The Standards Converter of claim 5, wherein said motion estimator retrieves information from consecutive input image frames and measures the motion of individual elements within an image frame and the motion of individual elements of at least one consecutive input frame to create a new intermediate image frame.

7. A telecine for translating images originally captured on film to a video signal, in which said images are represented by an electronic input signal having a number of input frames of a first frequency and being translated to said video output signal having a number of output frames of a second frequency, said telecine comprising:

a number of storage means for storing a field of the input signal;

an address generator, coupled to said storage means, for controlling the or each of the storage means;

an interpolator coupled to said storage means for filtering the fields of the input signal stored in the storage means to derive the output signal; and a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images, wherein said input signal is translated to said output signal in real time.

8. A telecine for translating images originally captured on film to a video signal, in which said images are represented by an electronic input signal having a number of input frames of a first frequency and being translated to said video output signal having a number of output frames of a second frequency, said telecine comprising:

a number of storage means each for storing a field of the input signal;

an address generator, coupled to said storage means, for controlling the or each of the storage means;

an interpolator coupled to said storage means for filtering the fields of the input signal stored in the storage means to derive the output signal; and a motion estimator for providing motion vectors of any objects moving in the images, said motion estimator being coupled to said address generator for manipulating the read or write addresses generated by said address generator, and said motion estimator being further coupled to said interpolator for manipulating the filtering thereby to compensate for movement of objects in the images, wherein said motion estimator creates new image frames corresponding to intermediate movements in time between original input image frames.

9. The telecine of claim 8, wherein said motion estimator retrieves information from consecutive input image frames and measures the motion of individual elements within an image frame and the motion of individual elements of at least one consecutive input frame to create a new intermediate image frame.

10. A method of translating images at least part of which were originally stored on film, said images being represented by an electronic input signal having a number of input frames of a first frequency and being translated to an electronic output signal having a number of output frames of a second frequency, said method comprising:

storing one or more fields of the input signal each in a respective storage means, generating addresses for controlling the storage means, interpolating across the or each field of the input signal stored in the storage means, by filtering the fields of the input signal stored in the storage means to derive the output signal generating motion vectors of any objects moving in the image, manipulating the generated read or write addresses for controlling the storage means, manipulating the interpolation step using said motion vectors to compensate for objects moving in the image, and creating new image frames in said motion estimator corresponding to intermediate movements in time between original input image frames.

11. The method of claim 10, wherein said creating step comprises the steps of:

retrieving consecutive input image frames from said storage means, measuring the motion of individual elements within an image frame, measuring the motion of individual elements of at least one consecutive input frame, and creating a new intermediate image frame from the measured motions of individual elements from said image frame and said at least one consecutive frame.

* * * * *